Dec. 31, 1957  J. L. HOCKENSMITH  2,817,857
ADJUSTABLE HEADREST
Filed Nov. 29, 1955  2 Sheets-Sheet 1
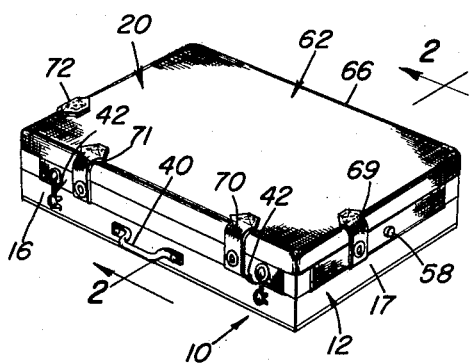
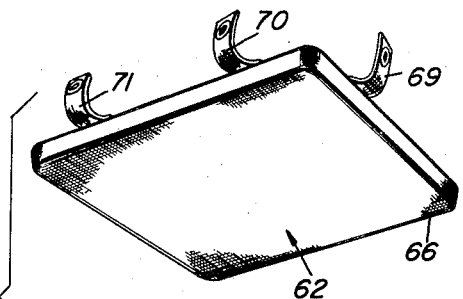
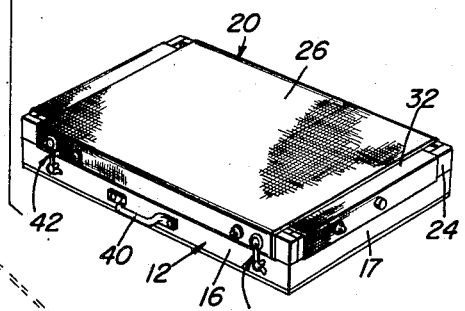
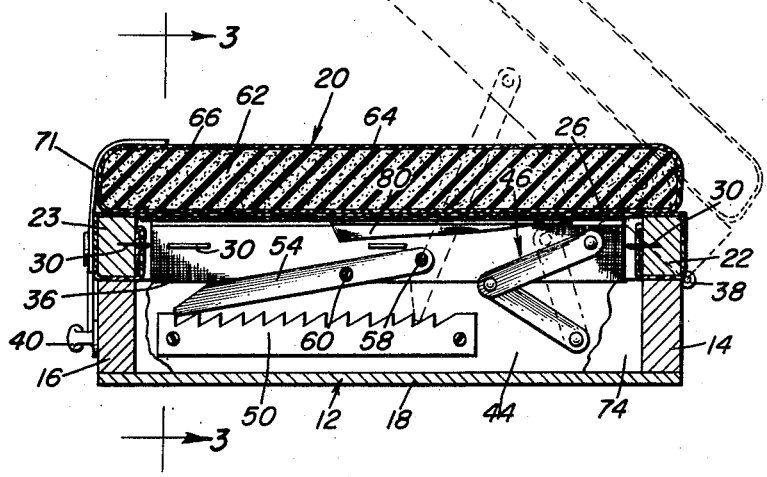
John L. Hockensmith
INVENTOR.

Dec. 31, 1957 J. L. HOCKENSMITH 2,817,857
ADJUSTABLE HEADREST
Filed Nov. 29, 1955 2 Sheets-Sheet 2

John L. Hockensmith
INVENTOR.

BY
Attorneys

United States Patent Office 2,817,857
Patented Dec. 31, 1957

2,817,857

ADJUSTABLE HEADREST

John L. Hockensmith, Chambersburg, Pa.

Application November 29, 1955, Serial No. 549,666

4 Claims. (Cl. 5—341)

This invention relates to supports and particularly to a headrest for an individual.

On the beach, camping and in other places, a person often desires to relax by resting on the ground. The present invention provides a device for permitting the picknickers, bathers, campers, or the like to rest more comfortably by having an adjustable headrest arranged to move through a wide range of angles so that the user may obtain a position comfortable to him for sleeping, reading or other activities.

A further object of the invention is to provide an adjustable headrest as described above, the headrest having provision therein to accommodate various and sundry articles in a storage compartment, it being within the purview and teaching herein that such articles may be carried in special pockets or on a flat surface in the headrest. This is particularly useful where the compartment may temporarily support beverages so that they are protected from the sand and from being spilled inadvertently.

A further object of the invention is to provide a headrest panel which is hinged to a support, the support having means associated with it to hold the headrest panel in selected angular positions.

Another object of the invention is to provide a practical device of the nature described herein, that is, one which is light weight, attractive, and which is capable of storing other articles so that it functions as a carrying case.

In addition, a further object is to provide means on the headrest panel for enhancing the comfort of the user, the means being a removably mounted cushion with the surfaces of the cushion so arranged that they are attractive in that they blend well with the general character of the headrest when in the closed position.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of the headrest;

Figure 2 is a transverse sectional view in an enlarged scale and taken on the line 2—2 of Figure 1;

Figure 4 is an exploded perspective view showing the cushion separated from the headrest panel of the headrest;

Figure 3:
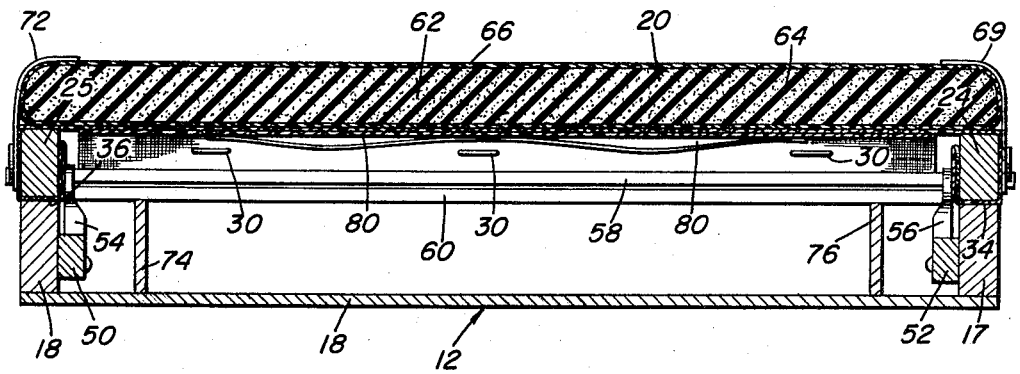
Figure 3 is a longitudinal sectional view taken on the line 3—3 of Figure 2 and in the direction of the arrows.

Adjustable headrest 10 is illustrated in Figures 1–4. It consists of a base or support 12, the latter being a rectangular frame having a back 14, a front 16, and sides 17 and 18. Support 12 has a fiberboard bottom 18 that is secured to the rectangular frame. The bottom may be made of other substances such as would be water repellent. There are many synthetic products presently available which will meet this specification.

Headrest 20 consists of a headrest panel, the latter including a rectangular frame having a back 22, a front 23, and sides 24 and 25. The headrest panel has an upper web 26 of canvas, nylon, or other cloth, the front edge being folded around the front 23 of the panel frame, while the rear edge is folded around the rear 22 of the panel frame. The front and rear edges of the web 26 are attached to the headrest panel frame by fasteners such as staples 30 that are applied from the inner surfaces of the panel frame front and back members. A second web 32 of similar material is superposed with respect to the web 26. Web 32 has one end 34 wrapped around the panel frame member 24 and the other end 36 wrapped around the panel frame member 25. These ends are held in place by staples or like fasteners.

The hardware for the headrest consists of either a piano hinge or several small hinges 38 attached to the rear member 22 of the headrest panel and to the rear 14 of the support 12. This mounts the headrest panel for swinging movement on the support 12. A carrying handle 40 is secured to the front 16 of the support 12, and means fastening the headrest panel to the support 12 are attached adjacent to the carrying handle 40. Such means may be expensive latches with locks, or the more inexpensive and simplified hook and eye assemblies 42 may be used.

Support 12 defines a compartment 44 in which various and sundry articles may be stored and carried. In addition, when the headrest panel is elevated, the compartment 44 may have its base 18 function as a tray. A pair of pivotally connected links 46 are pivoted respectively to the sides of the headrest panel frame and the support 12. A second pair of such links 48 are attached to the support 12 and the headrest panel. The function of the linkage assemblies 46 and 48 is to prevent over travel of the headrest panel with respect to the support 12.

Means for retaining the headrest panel in a selected angular position with respect to its support 12 are attached to the headrest panel and to the support. The preferred means consists of two racks 50 and 52, respectively, each rack being screwed or otherwise fastened to the opposite sides 17 and 18 of the support 12. The teeth of the rack space upwardly in order to be engaged by the pawls 54 and 56 that are attached to the pivot axle 58, the latter extending across the panel frame and being disposed in aligned apertures in the sides 24 and 25 thereof. A support brace 60 is secured to the pawls 54 and 56 intermediate their ends. When the headrest 20 is elevated with respect to its support 12, the pawls 54 and 56 slide over the teeth of racks 50 and 52 until the desired angular position of the headrest is obtained. At that angularity, the movement of the headrest is stopped and the pawls 54 and 56 come to rest between adjacent teeth of the racks. This retains the headrest 20 in the selected position.

In order to aid in the comfort of the user of the headrest, there is a cushion 62 disposed on and forming a part of the headrest panel. This cushion is preferably of a one-piece molded foam rubber body 64, since it holds its shape well. Other cushions may be used, although the described cushion is desired because of its comfort and attractiveness. Cushion 62 is covered by an envelope 66 of nylon or other flexible cloth. It is attached to the panel frame by means of a slide fastener or by a plurality of straps such as those at 69, 70, 71 and 72 which are stitched to the envelope 66. Snap fasteners are attached to the straps 69, 70, 71 and 72 and to the panel frame. In this way, the cushion is releasably secured in place so that it is optionally usable.

In order to prevent the various articles from becoming tangled with the linkages 46 and 48 and also the means for retaining the headrest in the selected angular position, a pair of dividers 74 and 76 are secured to the bottom 18 and to the front and rear 16 and 14, respectively, of the support 12. In this way, towels and other cloth articles are held in the center portion of the support 12 so that they do not become entangled with the moving linkages and other parts. The dividers 74 and 76 separate the compartment 44 into chambers so that selected articles may be held segregated from others. Moreover, the web 32 may be provided with pocket panels 80, which when stitched to web 32 form pockets in order to hold cosmetic articles, such as a mirror, comb, etc.

Figure 5:
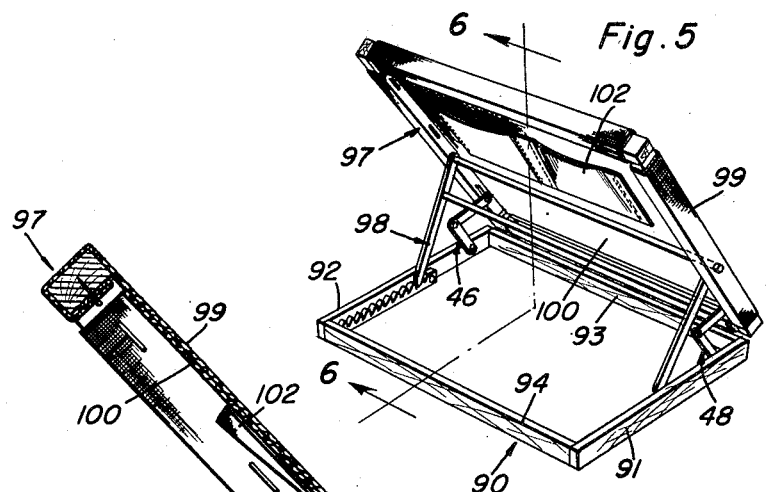
Figure 5 is a perspective view of a modification of the headrest, this being a simplified form.
Figure 6:
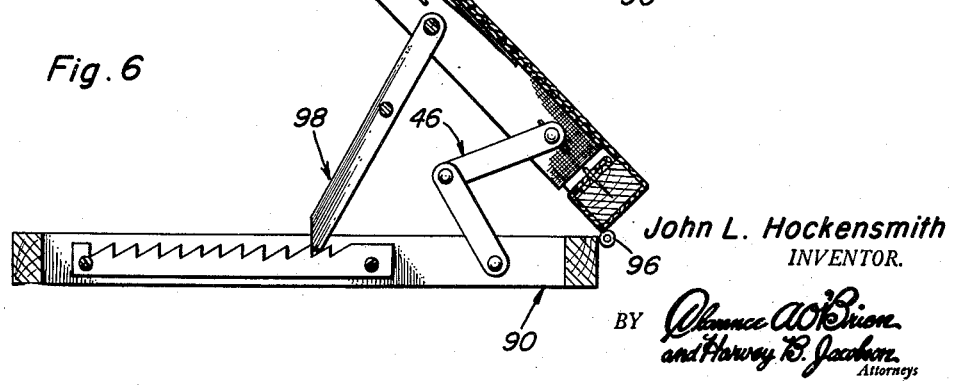
Figure 6 is a sectional view taken generally on the plane of line 6—6 of Figure 5 and in enlarged scale.

A simplified version of the invention is illustrated in Figures 5 and 6. It consists of a support 90, the latter being made of two sides 91 and 92, together with a back and a front 93 and 94, respectively. These pieces are attached together in order to form a rectangular frame such as the rectangular frame in Figure 2. Hinge 96 attaches the headrest panel 97 to the support 90, there being linkages 46 and 48 functionally identical to the previously described linkages, and means 98 consisting of racks and pawls, operatively attached to the support 90 and the headrest panel 97 in order to hold the headrest panel in the selected angular position with respect to the support 90. These structural parts are identical to those described previously in connection with the initially described embodiment. In addition, the headrest panel consists of a rectangular frame on which the webs 99 and 100 are mounted in a manner identical to the webs 26 and 32. Pocket panels 102 may be used with the headrest panel 97.

Although the headrest may be made of different sizes, it is observed that the headrest of Figure 6 is identical in all respects to the headrest of Figure 2, but for the omission of the cushion 62, the hardware except hinge 96, and the support bottom 18. The headrest of Figure 6 is considerably less expensive having a minimum of parts to serve a headrest function.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A headrest comprising a support, said support consisting of a rectangular frame having a bottom and functioning as a compartment for various and sundry articles, a headrest panel including a frame hingedly connected at one edge to said support and having sides, a web secured to said frame and extending thereacross, means for holding said headrest panel in selected angular positions with respect to said support and comprising racks on the confronting surfaces of said sides, and pawls pivoted to the sides of said headrest panel frame, a cushion secured to said frame including a resilient body, a cover on said body, straps on said cover, snap fasteners carried by said straps and said panel frame for releasably securing said cover and body to said panel frame.

2. The headrest of claim 1 together with means for preventing over travel of said headrest panel with respect to said support.

3. In a portable headrest, a support, a headrest panel, a hinge connecting said panel to said support, means for retaining said headrest panel in selected angular positions with respect to said support, said panel including a frame, and flexible webs secured to said frame, a cushion on said flexible webs, means releasably securing said cushion to said frame, a storage pocket panel on one of said webs, and means in said support for preventing articles therein from becoming entangled with said headrest panel retaining means.

4. In a portable headrest, a support, a headrest panel, a hinge connecting said panel to said support, means for retaining said headrest in selected angular positions with respect to said support and being disposed within said support and within said headrest panel, said panel including a frame, flexible webs secured to said frame, a cushion, means securing said cushion on said web, means in said support for preventing articles therein from becoming tangled with said headrest panel retaining means and including a pair of dividers located within said support which separate said support into compartments, two of said compartments accommodating said headrest panel retaining means.

References Cited in the file of this patent

UNITED STATES PATENTS

| | | |
|---|---|---|
| 676,765 | Nincehelser | June 18, 1901 |
| 1,103,730 | Anderson | July 14, 1914 |
| 2,047,035 | Rosenberg | July 7, 1936 |
| 2,250,026 | Laukhuff | July 22, 1941 |
| 2,304,700 | Manville | Dec. 8, 1942 |
| 2,738,249 | Tenenblatt | Mar. 13, 1956 |